2,806,884
Patented Sept. 17, 1957

2,806,884
1-ALKENYL S-HYDROCARBYLMERCAPTOALKYL ETHERS AND PROCESS FOR THE SAME

William J. Tapp, Charleston, and Amelio E. Montagna, South Charleston, W. Va., assignors to Union Carbide Corporation, a corporation of New York No Drawing. Application January 11, 1956,
Serial No. 558,429

15 Claims. (Cl. 260—609)

This invention relates to new sulfur-containing unsaturated ethers and to a process for their production. In particular, it relates to 1-alkenyl S-hydrocarbylmercaptoalkyl ethers.

The compositions of this invention can be represented by the general chemical formula:

$$R_1R_2C=CR_3OASB$$

wherein $R_1$, $R_2$, and $R_3$ are hydrogen or alkyl radicals, A is an alkylene radical, and B is a hydrocarbyl radical free of acetylenic unsaturation.

Compounds such as these are valuable in the formation of polymeric materials and provide new routes to useful compositions. The Diels-Alder reaction with such compounds provides a method for forming substituted cyclohexenes, dihydropyrans, and so forth. Additionally, hydrogenation of the unsaturated ethers leads to useful solvents and extractants. Furthermore, polymerization of these new compositions leads to materials which are particularly well suited to use as oil additives whereby the viscosity-temperature properties of the oil are improved and the tendency of the lubricant toward oxidative decomposition is inhibited.

Our preferred method of making the new sulfur-containing unsaturated ethers is by way of the liquid phase dealcoholation of the corresponding acetals or ketals. As is well known, acetals and ketals may be formed via the reaction between two mols of an alcohol and one of an aldehyde or ketone. The alcohols useful in our method of making the new unsaturated ethers may be prepared by reacting a hydroxy alkyl halide with an alkali hydrocarbyl mercaptide, as illustrated by:

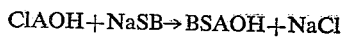

or by reacting a hydrocarbyl halide with an alkali hydroxy alkyl mercaptide, as illustrated by:

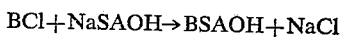

In the compounds indicated in these equations, B is a hydrocarbyl radical free of acetylenic unsaturation, by which designation it is intended to include monovalent hydrocarbon radicals such as alkyl, alkenyl, cycloalkyl, cycloalkenyl, aryl, aralkyl and the like; A is an alkylene radical.

A particularly desirable path to alcohols of the above structure wherein A is an ethylene or methylethylene radical is via the reaction between ethylene oxide or propylene oxide and a mercaptan, illustrated by:

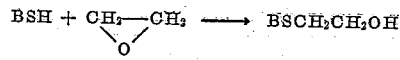

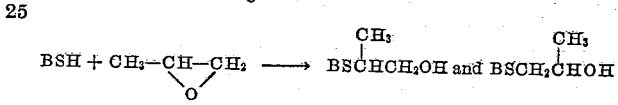

The ethers ultimately derived from such alcohols as these (A in the formula for the alcohols and in the formula for the ethers is an ethylene or a methylethylene radical) are an especially preferred group of ethers both as new compositions and in the method of our invention.

Table 1, following, shows the S-substituted mercaptoalkanols we have made along with their physical properties. The ethers illustrated in Table 1 were made by reacting the appropriate hydrocarbyl halide with the required alkali hydroxy alkyl mercaptide.

TABLE 1

| Compound | Yield percent of theory | Boiling point, °C., at 10 mm. | Specific gravity at 20/20° C. | Refractive index at 20° C. | Molecular refraction Calculated | Molecular refraction Observed | Purity, wt. percent [a] |
|---|---|---|---|---|---|---|---|
| S-substituted Mercaptoalkanols: | | | | | | | |
| S-methylmercaptoethanol | 91.0 | 61 | 1.0628 | 1.4946 | 25.55 | 25.22 | |
| S-ethylmercaptoethanol | 91.2 | 72 | 1.0177 | 1.4872 | 30.17 | 30.05 | 99.2 |
| S-allylmercaptoethanol | 93.3 | 87 | 1.0307 | 1.5096 | 34.32 | 34.22 | 99.5 |
| S-butylmercaptoethanol | 93.0 | 97 | 0.966 | 1.4800 | 38.40 | 39.32 | |
| S-hexylmercaptoethanol | 77.0 | 124 | 0.9457 | 1.4781 | 48.60 | 48.50 | 99.8 |
| S-(2-ethylhexyl)mercaptoethanol | 88.8 | 136 | 0.9354 | 1.4783 | 57.88 | 57.50 | 100.0 |
| S-benzylmercaptoethanol | 86.2 | 157 | 1.103 | 1.5770 | 49.66 | 50.55 | 99.1 |

[a] Determination of hydroxyl content by acylation.

Acetals and ketals suitable for the production of the compositions of this invention may be obtained by way of the reaction between a hydroxy thio ether and an aldehyde or ketone in the presence of an acid catalyst as shown by the chemical equation:

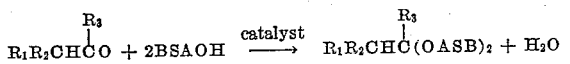

$$R_1R_2CHCHO + 2BSAOH \xrightarrow{catalyst} R_1R_2CHCH(OASB)_2 + H_2O$$

In this equation $R_1$, $R_2$, and $R_3$ can be hydrogen or an alkyl radical of from 1 to 6 carbon atoms.

Table 2, following shows the compounds of the formula $R_1R_2CHCR_3(OASB)_2$ which we have made and the physical properties measured.

TABLE 2

| Compound | Yield percent of theory | Boiling point (° C.) at indicated pressure (mm. hg) | Specific gravity at 20/20° C. | Refractive index at 20° C. | Molecular refraction | | Purity, wt. percent a |
|---|---|---|---|---|---|---|---|
| | | | | | Calculated | Observed | |
| Acetals: | | | | | | | |
| Di(S-methylmercaptoethyl) | 55.8 | 144°/10 mm | 1.0612 | 1.4956 | 58.37 | 57.95 | |
| Di(S-ethylmercaptoethyl) | 58.4 | 159°/10 mm | 1.0216 | 1.4894 | 67.60 | 67.35 | |
| Di(S-allylmercaptoethyl) | 47.5 | 164°/5 mm | 1.0345 | 1.5097 | 75.91 | 75.70 | 99.9 |
| Di(S-butylmercaptoethyl) | 57.0 | 170°/3 mm | 0.9783 | 1.4829 | 86.08 | 86.00 | 98.8 |
| Di(S-hexylmercaptoethyl) | 62.0 | 197°/2 mm | 0.954 | 1.4805 | 104.50 | 104.30 | 100.2 |
| Di[S-(2-ethylhexyl)mercaptoethyl] | 50.1 | 216°/2 mm | 0.9434 | 1.4807 | 123.02 | 122.60 | |
| Di(S-benzylmercaptoethyl) | 59.1 | 246°/2.6 mm | 1.115 | 1.5725 | 106.59 | 107.60 | 101.9 |
| Butyrals: | | | | | | | |
| Di(S-methylmercaptoethyl) | 52.3 | 161°/10 mm | 1.0265 | 1.4889 | 67.61 | 66.92 | |
| Di(S-butylmercaptoethyl) | 55.4 | 196°/5 mm | 0.9639 | 1.4807 | 95.32 | 95.20 | | a Determination of acetal content by hydrolysis and analysis for aldehyde by reaction with hydroxylamine.

The course of the reaction by which the ether is formed is indicated by the equation:

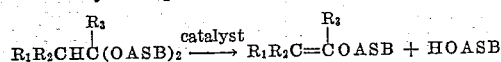

$$R_1R_2CHC(OASB)_2 \xrightarrow{catalyst} R_1R_2C=COASB + HOASB$$

From this equation it is seen that one of the products is the hydroxy thio ether from which the acetal may be formed. This hydroxy thio ether may advantageously be employed to make more of the acetal.

Following the general procedure given above, and appearing in greater detail hereinafter, 1-alkenyl S-hydrocarbylmercaptoalkyl ethers having the above formula wherein $R_1$, $R_2$ and $R_3$ may each be a hydrogen atom or an alkyl radical such as methyl, ethyl, propyl, butyl, hexyl, and the like; A may be alkylene radical such as ethylene, methylethylene, propylene, butylene, and so forth, and B is a hydrocarbyl radical such as methyl, ethyl, propyl, butyl, 2-ethylbutyl, hexyl, 2-ethylhexyl, octyl, lauryl, allyl, benzyl, cyclohexyl, and the like, may be prepared.

The method of our invention involves dealcoholating a compound of the formula:

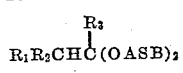

$$R_1R_2CHC(OASB)_2$$

in the liquid phase in the presence of a strong acid catalyst and recovering from the reaction mixture a 1-alkenyl S-hydrocarbylmercaptoalkyl ether of the formula:

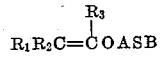

$$R_1R_2C=COASB$$

in which $R_1$, $R_2$ and $R_3$ can be hydrogen or an alkyl radical of from 1 to 6 carbon atoms; A is an alkylene radical of from 1 to 4 carbon atoms; and B is a hydrocarbyl radical free of acetylenic unsaturation and containing from 1 to 12 carbon atoms. Our preferred method for recovering the ether from the reaction mixture is by distillation.

We have discovered that markedly improved yields of the 1-alkenyl S-hydrocarbylmercaptoalkyl ethers are obtained if the ether is removed from the reaction mixture substantially at the rate at which it is formed.

A suitable apparatus for the reaction is a reaction vessel provided with a source of heat and fitted with a fractionating distillation column. For optimum results, the distillation column should be so chosen as to be of a capacity to handle the products at the rate produced.

In most cases the reaction may advantageously be conducted under reduced pressures. Reduced pressures permit a lower pot temperature and thereby a reduction of undesirable side reactions. Reduced pressures also facilitate isolation of the products.

After recovery of the crude product it may easily be refined by fractional distillation.

Other methods of refining the ethers, particularly when the major impurity in the ether is the corresponding S-hydrocarbylmercaptoalkanol (previously indicated by the formula HOASB), include causing the alcohol to react with the ether under the influence of a catalyst such as originally employed to effect the dealcoholation with the consequent formation of an acetal and, after neutralizing the catalyst, distilling the ether to separate it from the higher boiling acetal.

Another method of purifying the ethers comprises co-distilling the ether as a minimum boiling azeotrope from the mixture. Water-soluble lower alkyl glycols form suitable minimum boiling azeotropes. Illustrative of such glycols are ethylene glycol, diethylene glycol and propylene glycol. After separating the ether by means of such a minimum boiling azeotrope the glycol can be removed from the ether by extracting the glycol from the ether with water.

Strong acids such as sulfuric, phosphoric, the aromatic sulfonic acids, and other substantially non-volatile acids of comparable strength are all suitable catalysts. The preferred catalyst is phosphoric acid. Catalyst concentrations of 0.005 to 5.0 percent by weight of the reaction mixture may be employed. Preferably the catalyst is employed in a concentration of 0.05 to 1.0 percent by weight of the reaction mixture. In the usual case, the catalyst concentration is determined by the rate of decomposition desired.

A suitable range of temperatures is from 100° C. to 250° C. when the pressure range is selected in the range from 0.1 to 100 mm. of mercury, absolute. The preferred range of temperature is from 125° C. to 175° C. and is concurrently employed with the pressure range of 0.1 to 10 mm. of mercury. In order to facilitate rapid removal of the products from the reaction mixture, it is preferred that a reaction temperature higher than the boiling point of the ether, at the reaction pressure, be employed. A preferred reaction temperature is one near the boiling point, at the reaction pressure, of the compound being dealcoholated, i. e., the acetal or ketal being dealcoholated.

Inasmuch as the products formed by decomposition of the acetal can react to again form the acetal, particularly so under acidic conditions, it is desirable that the products be collected under alkaline conditions. A variety of alkaline materials are suitable for providing the desired alkalinity. They include inorganic bases such as sodium carbonate and hydroxide, alcoholates such as sodium alcoholate, and amines such as di(2-ethylhexyl) amine and triethanolamine.

The use of an inert diluent in the reaction mixture is not requisite to the successful operation of our method; however, such a diluent may be employed.

In a preferred method of producing the ethers of our invention, a reaction mixture of the corresponding acetal or ketal and a substantially non-volatile strong acid is heated under reduced pressure to a temperature sufficient to vaporize the ether; the ether is recovered by condensing the vapor so produced, and collecting the condensate under alkaline conditions.

A preferred method for making 1-alkenyl S-hydrocarbylmercaptoalkyl ethers of the formula

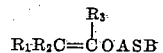

wherein $R_1$, $R_2$ and $R_3$ can be hydrogen or an alkyl radical of from 1 to 6 carbon atoms and $R_1$, $R_2$ and $R_3$ taken collectively contain at most 10 carbon atoms; A is an alkylene radical of from 1 to 4 carbon atoms; B is a hydrocarbyl radical free of acetylenic unsaturation containing from 1 to 12 carbon atoms; and $R_1$, $R_2$, $R_3$, A, and B taken collectively contain, at most, 20 carbon atoms, comprises heating a reaction mixture of the corresponding compound of the formula

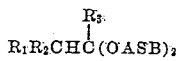

and a strong acid catalyst which is substantially non-volatile under the reaction conditions in the liquid phase to a temperature sufficient to vaporize the 1-alkenyl S-hydrocarbylmercaptoalkyl ether and an alcohol co-product of the formula HOASB, thereby dealcoholating the said heated compound and forming and vaporizing said ether and said alcohol co-product and recovering the vapors of the ether and the alcohol co-product.

When the hydrocarbyl radical, B, is ethylenically unsaturated improved yields are obtained if the above-described process is modified by first heating the compound being dealcoholated to a temperature at which the ether produced is vaporized and thereafter initiating the dealcoholation reaction by adding the acid catalyst. By adding the catalyst after the acetal or ketal has been brought to the desired operating temperature the formation of polymeric by-products is repressed and the yield of ether is improved.

By the method of our invention, we have made the compositions of our invention, the 1-alkenyl S-hydrocarbylmercaptoalkyl ethers of the formula:

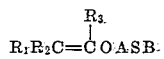

wherein $R_1$, $R_2$ and $R_3$ can be hydrogen or an alkyl radical of from 1 to 6 carbon atoms and $R_1$, $R_2$ and $R_3$ taken collectively contain at most 10 carbon atoms; A is an alkylene radical of from 1 to 4 carbon atoms; B is a hydrocarbyl radical free of acetylenic unsaturation containing from 1 to 12 carbon atoms; $R_1$, $R_2$, $R_3$, A, and B taken collectively contain at most 20 carbon atoms.

These ethers are colorless compounds having the marked odor characteristic of compounds containing a thioether group. They show the chemical characteristics of 1-alkenyl ethers in that they react with alcohols to form acetals and may be hydrolyzed to form aldehydes and alcohols.

The following examples are illustrative:

*Example I.—Vinyl S-methylmercaptoethyl ether*

(A) PREPARATION OF S-METHYLMERCAPTO-ETHANOL

Into a 12-liter flask equipped with a stirrer, a brine-cooled reflux condenser surmounted by a Dry Ice-acetone (solid CO₂-acetone)-cooled reflux condenser, a thermometer, and an additional funnel, there were placed 5 liters of anhydrous ethanol and 1000 grams (25 moles) of sodium hydroxide. During a period of 1.5 hours, 1953 grams (25 moles) of mercaptoethanol were slowly added from the addition funnel while the contents of the flask were continuously and vigorously stirred. The stirring was continued thereafter until all of the solid sodium hydroxide had been dissolved. The heat of reaction evolved from the formation of the mercaptide was sufficient to cause the ethanol to reflux in the brine-cooled condenser. After all of the sodium hydroxide had entered into solution, the addition funnel was replaced by a convenient length of 6-mm. glass tubing one end of which extended well below the surface of the liquid mixture. Through this tube, 1263 grams (25 moles) of methyl chloride gas were added while the reaction mixture was vigorously stirred. Because this reaction was exothermic no external heating was necessary during the initial three hours of the feeding period. The rate of feed was determined by the cooling capacity of the reflux condenser. A total period of five hours was required to complete the addition of methyl chloride. The reaction mixture was stirred for an additional period of two hours at total reflux. Then, after the reaction mixture had cooled to room temperature, it was filtered through a Buchner funnel and the precipitate of sodium chloride was washed with 2 liters of ethanol. The combined filtrate and washings were distilled through a 25 by 600-mm. still column packed with stainless steel saddles. After essentially all of the ethanol had been distilled at atmospheric pressure, and after a small forerun at reduced pressure, a fraction distilling at 75° C. at 22 mm. of mercury pressure was collected. This distillate, S-methylmercaptoethanol amounted to 2091 grams (22.7 moles) which corresponded to a yield of 91 percent of the theoretical value.

(B) PREPARATION OF DI(S-METHYLMERCAPTO-ETHYL)ACETAL

To a 5-liter reaction flask equipped with stirrer, addition funnel, reflux condenser, and thermometer, was charged 3312 grams (36 moles) of S-methylmercaptoethanol and 1.9 grams of concentrated sulfuric acid catalyst. To this mixture was added 528 grams (12 moles) of acetaldehyde during a period of 5 minutes during which period the temperature of the reaction mixture increased from 25° C. to 52° C. After the maximum temperature, 52° C., was reached the mixture was stirred for one hour. Following this period, 55 grams of a 10 percent aqueous solution of potassium hydroxide was added and stirring was continued for an additional period of one hour. The crude product was distilled at reduced pressure using a 25 by 600-mm. column packed with 6-mm. glass rings. After removing the low-boiling materials, such as acetaldehyde, water, etc., unreacted S-methylmercaptoethanol amounting to 22.2 moles was recovered. A fraction, 1408 grams (6.69 moles) of di-(S-methylmercaptoethyl)acetal, boiling at from 98° to 105° C. at 1 mm. of mercury absolute pressure, was collected. This corresponded to a yield of 55.8 percent of theory, based upon the quantity of acetaldehyde charged.

(C) PREPARATION OF VINYL S-METHYLMERCAPTO-ETHYL ETHER

Into a 500-milliliter flask equipped with an addition funnel and a thermometer, and attached to a 25 by 300-mm. still column packed with stainless steel sponge and fitted with a total-condensing variable takeoff still head, there was placed 200 grams of di-(S-methylmercaptoethyl)acetal and 1.0 ml. of 85 percent phosphoric acid catalyst. To prevent recombination of the co-products, vinyl S-methylmercaptoethyl ether and S-methylmercaptoethanol, 3.0 ml. of triethanolamine was placed into the product receiver. The pressure in the system was reduced to from 3 to 5 mm. of mercury, and the mixture was heated at a reaction temperature of from 125° to 145° C. The crude product was distilled at a reflux ratio of about 1:1 at a vapor temperature of from 55° to 70° C. Additional acetal was fed to the reaction flask to replace the amount decomposed. A total of 900 grams (4.28 moles) of acetal was dealcoholated in the reaction and the crude product upon redistillation yielded 500 grams of an azeotropic mixture, 80 percent of which was vinyl S-methylmercaptoethyl ether and 20 percent was S-methylmercaptoethanol. The yield of ether corresponded to 79.0 percent of the theoretical yield.

Refined ether was prepared by treating a portion of the azeotrope with a few drops of a 25 percent solution of sulfuric acid in S-methylmercaptoethanol. An exothermic reaction occurred in which the alcohol present was reconverted to the acetal by reaction with some of the vinyl ether. Following neutralization of the acid, the reaction mixture was fractionally distilled to yield a product with the following properties: B. P.=43° C. at 10 mm. Hg, 63° C. at 30 mm. Hg, and 74° C. at 50 mm. Hg; $n_D^{20}$=1.4774; sp. g. at 20/20° C.=0.9739; molecular refraction, calculated=34.44, observed=34.31; and purity=97.3 percent by determination of the vinyl ether function.

*Example II.—Vinyl S-ethylmercaptoethyl ether*

(A) PREPARATION OF S-ETHYLMERCAPTOETHANOL

The preparation of S-ethylmercaptoethanol was undertaken in a procedure analogous to that described in Example I for the S-methyl homolog with the exception that ethyl chloride was introduced into the reaction mixture instead of methyl chloride. The yield of S-ethylmercaptoethanol B. P. 73–74° C. at 10 mm. of mercury absolute pressure was 91.2 percent of theoretical value.

(B) PREPARATION OF DI(S-ETHYLMERCAPTOETHYL)-ACETAL

Di(S-ethylmercaptoethyl)acetal was prepared from acetaldehyde and S-ethylmercaptoethanol by a procedure similar to that in Example I, and the product, B. P. 126–130° C. at 1.5–2 mm. of mercury absolute pressure, was isolated in a yield of 58.4 percent of theory, based upon acetaldehyde charged to the reaction mixture.

(C) PREPARATION OF VINYL S-ETHYLMERCAPTO-ETHYL ETHER

Dealcoholation of the acetal by the procedure described in Example I produced vinyl S-ethylmercaptoethyl ether in 71.3 percent yield based upon ether contained in the azeotropic mixture. Refined vinyl ether was prepared as described in Example I, and exhibited the following properties: B. P. at 10 mm. of Hg=60° C.; specific gravity 20/20° C.=0.9509; refractive index, $n_D^{20}$=1.4738; molar refraction, calculated=39.05, observed=39.00; purity=98.5 percent.

*Example III.—Vinyl S-allylmercaptoethyl ether*

S-allylmercaptoethanol and di(S-allylmercaptoethyl)-acetal were prepared from allyl chloride, mercaptoethanol, and acetaldehyde, by procedures similar to those described in Example I, in yields of 93.3 and 47.5 percent of theory respectively. Dealcoholation of the acetal gave vinyl S-allylmercaptoethyl ether in 65.5 percent yield based upon the vinyl ether content of the azeotropic mixture. Refined ether was prepared by the same process as described in Example I and exhibited the following properties: B. P. at 15 mm. of Hg=78° C.; specific gravity of 20/20° C.=0.9666; refractive index $n_D^{20}$=1.4920; molecular refraction, calculated=43.21, observed=42.85; purity—97.2 percent.

*Example IV.—Vinyl S-butylmercaptoethyl ether*

S-butylmercaptoethanol and di(S-butylmercaptoethyl)-acetal were prepared from butyl chloride, mercaptoethanol, and acetaldehyde, by procedures similar to those described in Example I, in yields of 93.0 and 57.0 percent of theory respectively. Dealcoholation of the acetal gave vinyl S-butylmercaptoethyl ether in 84.7 percent yield based upon the vinyl ether content of the azeotropic mixture. Refined ether was prepared by the process described in Example I and exhibited the following properties: B. P. at 10 mm. of Hg=87° C.; specific gravity 20/20° C.=0.9268; refractive index $n_D^{20}$=1.4710; molecular refraction, calculated=48.29, observed=48.60; purity=99.1 percent.

*Example V.—Vinyl S-Hexylmercaptoethyl ether*

S-Hexylmercaptoethanol and di-(S-hexylmercaptoethyl)acetal were prepared from hexyl chloride, mercaptoethanol, and acetaldehyde, by procedures similar to those described in Example I, in yields of 77.0 and 62.0 percent respectively. Dealcoholation of the acetal gave vinyl S-hexylmercaptoethyl ether in a yield of 89.5 percent based upon the ether content of the azeotropic mixture. Refined ether was obtained by codistillation of this azeotropic mixture with ethylene glycol to yield an ether-ethylene glycol azeotrope from which the glycol was removed by extraction using water. Further refining was accomplished as described in Example I; the ether then exhibited the following properties: B. P. at 10 mm. of Hg=115° C.; specific gravity 20/20° C.=0.9128; refractive index $n_D^{20}$=1.4707; molecular refraction, calculated=58.53, observed=57.60; purity=98.4 percent.

*Example VI.—Vinyl S-(2-ethylhexyl)mercaptoethyl ether*

S-(2-ethylhexyl)mercaptoethanol and di-[S-(2-ethylhexyl)mercaptoethyl] acetal were prepared from 2-ethylhexyl chloride, mercaptoethanol, and acetaldehyde, by procedures similar to those described in Example I, in yields of 88.8 and 50.1 percent respectively. Dealcoholation of the acetal gave vinyl S-(2-ethylhexyl)mercaptoethyl ether in 75.9 percent yield based upon the ether content of the azeotropic mixture. Refined ether was obtained by codistillation with diethylene glycol as described in Example V, and exhibited the following properties: B. P. at 10 mm. of Hg=132° C.; specific gravity 20/20° C.=0.9079; $n_D^{20}$=1.4717; molecular refraction, calculated=66.76, observed=66.50; purity=98.5 percent.

*Example VII.—Vinyl S-benzylmercaptoethyl ether*

S-Benzylmercaptoethanol and di(S-benzylmercaptoethyl) acetal were prepared from benzyl chloride, mercaptoethanol, and acetaldehyde, by methods similar to those described in Example I, in yields of 86.2 and 59.1 percent, respectively. Dealcoholation of the acetal gave vinyl S-benzylmercaptoethyl ether in 72.2 percent yield, based upon the ether content of the azeotropic mixture. Refined ether was obtained by codistillation with diethylene glycol, as described in Example V. Properties of the refined ether are as follows: B. P. at 1 mm. of Hg=100° C.; specific gravity 20/20° C.=1.053; refractive index $n_D^{20}$=1.5500; molecular refraction, calculated=58.54, observed=58.75; purity=100.0 percent.

*Example VIII.—1-butenyl S-methylmercaptoethyl ether*

Di-(S-methylmercaptoethyl)butyral was prepared from the reaction of S-methylmercaptoethanol and n-butyraldehyde in a 3 to 1 mol ratio by a procedure similar to that described for the acetal in Example I. The yield of butyral was 52.3 percent of the theoretical value based upon butyraldehyde. Dealcoholation of the butyral gave 1-butenyl S-methylmercaptoethyl ether which was obtained as a refined material by fractional distillation of the crude dealcoholation product. The yield of refined ether was 54.3 percent of theory and the ether had the following properties: B. P. at 10 mm. of Hg=75° C.; specific gravity 20/20° C.=0.9387; refractive index $n_D^{20}$=1.4764; molecular refraction, calculated=43.67, observed=43.91; purity=98.2 percent.

*Example IX.—1-butenyl S-butylmercaptoethyl ether*

Di-(S-butylmercaptoethyl)butyral was prepared from S-butylmercaptoethanol and butyraldehyde, as in Example VIII in 55.4 percent yield. Dealcoholation and refining, as in Example 8, gave 1-butenyl S-butylmercaptoethyl ether as a refined material in a yield of 65.9 percent of theory having the following properties: B. P. at 10 mm. of Hg=116° C.; specific gravity 20/20° C.= 0.9100; refractive index $n_D^{20}$=1.4723; molecular refraction, calculated=57.51, observed=57.95; purity=98.3 percent.

We claim:

1. The 1-alkenyl S-hydrocarbylmercaptoalkyl ethers having the formula:

$$R_1R_2C=\underset{\underset{\displaystyle OASB}{|}}{C}$$

wherein $R_2$ and $R_3$ are H and $R_1$ is selected from the group consisting of H and alkyl radicals of from 1 to 6 carbon atoms; A is an alkylene radical of from 1 to 4 carbon atoms; B is selected from the group consisting of alkyl radicals of from 1 to 12 carbon atoms, benzyl radical, and allyl radical: $R_1$, $R_2$, $R_3$, A, and B taken collectively contain at most 20 carbon atoms.

2. The compositions of claim 1 wherein $R_1$, $R_2$ and $R_3$ are H.

3. The compositions of claim 1 wherein $R_1$ is an ethyl radical and $R_2$ and $R_3$ are H.

4. The compositions of claim 1 wherein $R_1$, $R_2$, and $R_3$ are H, and A is an ethylene radical.

5. The compositions of claim 1 wherein $R_1$ is an ethyl radical, $R_2$ and $R_3$ are H, and A is an ethylene radical.

6. Vinyl S-ethylmercaptoethyl ether.

7. Vinyl S-(2-ethylhexyl)mercaptoethyl ether.

8. Vinyl S-benzylmercaptoethyl ether.

9. Vinyl S-allylmercaptoethyl ether.

10. 1-butenyl S-butylmercaptoethyl ether.

11. The method of making a 1-alkenyl S-hydrocarbylmercaptoalkyl ether of the formula $$R_1R_2C=\underset{\underset{\displaystyle OASB}{|}}{C}$$

wherein $R_2$ and $R_3$ are H and $R_1$ is selected from the group consisting of H and alkyl radicals of from 1 to 6 carbon atoms, A is an alkylene radical from 1 to 4 carbon atoms, and B is selected from the group consisting of alkyl radicals containing from 1 to 12 carbon atoms, benzyl radical, and allyl radical which comprises heating a reaction mixture of the corresponding compound having the formula $$R_1R_2CH\underset{\underset{\displaystyle (OASB)_2}{|}}{C}$$

and a strong acid catalyst selected from the group consisting of phosphoric acid, sulfuric acid, and aromatic sulfonic acids, in the liquid phase to a temperature sufficient to vaporize the said 1-alkenyl S-hydrocarbylmercaptoalkyl ether and the alcohol co-product of the formula HOASB thereby dealcoholating said compound and forming and vaporizing said ether and said alcohol co-product; and recovering said vapors.

12. The method of making a 1-alkenyl S-hydrocarbylmercaptoalkyl ether of the formula $$R_1R_2C=\underset{\underset{\displaystyle OASB}{|}}{C}$$

wherein $R_2$ and $R_3$ are H and $R_1$ is selected from the group consisting of H and alkyl radicals of from 1 to 6 carbon atoms, A is an alkylene radical from 1 to 4 carbon atoms, and B is selected from the group consisting of alkyl radicals containing from 1 to 12 carbon atoms, benzyl radical, and allyl radical which comprises heating a reaction mixture of the corresponding compound having the formula $$R_1R_2CH\underset{\underset{\displaystyle (OASB)_2}{|}}{C}$$

and a strong acid catalyst selected from the group consisting of phosphoric acid, sulfuric acid, and aromatic sulfonic acids, in the liquid phase to a temperature near the boiling point of the compound heated under a reaction pressure in the range from 0.1 mm. to 100 mm. of mercury absolute, thereby forming and vaporizing said ether and an alcohol co-product of the formula HOASB, and recovering said vapors.

13. The method of making a 1-alkenyl S-hydrocarbylmercaptoalkyl ether of the formula $$R_1R_2C=\underset{\underset{\displaystyle OASB}{|}}{C}$$

wherein $R_2$ and $R_3$ are H and $R_1$ is selected from the group consisting of H and alkyl radicals of from 1 to 6 carbon atoms, A is an alkylene radical from 1 to 4 carbon atoms, and B is selected from the group consisting of alkyl radicals containing 1 to 12 carbon atoms, benzyl radical, and allyl radical which comprises heating a reaction mixture of the corresponding compound having the formula $$R_1R_2CH\underset{\underset{\displaystyle (OASB)_2}{|}}{C}$$

and a strong acid catalyst selected from the group consisting of phosphoric acid, sulfuric acid, and aromatic sulfonic acids in the liquid phase to a temperature in the range of from 100° C. to 250° C. and under a pressure in the range of from 0.1 to 100 mm. of mercury, said temperature being sufficient to vaporize said ether and an alcohol co-product of the formula HOASB thereby dealcoholating said compound and forming and vaporizing said ether and said alcohol co-product.

14. The method of making a 1-alkenyl S-hydrocarbylmercaptoalkyl ether of the formula $$R_1R_2C=\underset{\underset{\displaystyle OASB}{|}}{C}$$

wherein $R_2$ and $R_3$ are H and $R_1$ is selected from the group consisting of H and alkyl radicals of from 1 to 6 carbon atoms, A is an alkylene radical of from 1 to 4 carbon atoms and B is selected from the group consisting of alkyl radicals containing from 1 to 12 carbon atoms, benzyl radical, and allyl radical, and wherein $R_1$, $R_2$, $R_3$, A, and B taken collectively contain at most 20 carbon atoms, which comprises heating a reaction mixture of the corresponding compound having the formula $$R_1R_2CH\underset{\underset{\displaystyle (OASB)_2}{|}}{C}$$

and a strong acid catalyst selected from the group consisting of phosphoric acid, sulfuric acid, and aromatic sulfonic acids, said catalyst being present in an amount of from 0.005 to 5.0 percent by weight of the reaction medium, in the liquid phase to a temperature in the range from 100° C. to 250° C. and under a pressure in the range of from 0.1 to 100 mm. of mercury, said temperature being greater than the boiling point of said ether under the reaction pressure, thereby dealcoholating said compound and forming and vaporizing said ether and an alcohol co-product of the formula HOASB, and condensing and recovering said vapors.

15. The process of claim 14 wherein the strong acid catalyst is phosphoric acid.

References Cited in the file of this patent

UNITED STATES PATENTS 2,664,414     Morris et al.  ----------- Dec. 29, 1953

OTHER REFERENCES

Hill: J. Am. Chem. Soc. 50, 2725–2731 (1928).